Figure 1:
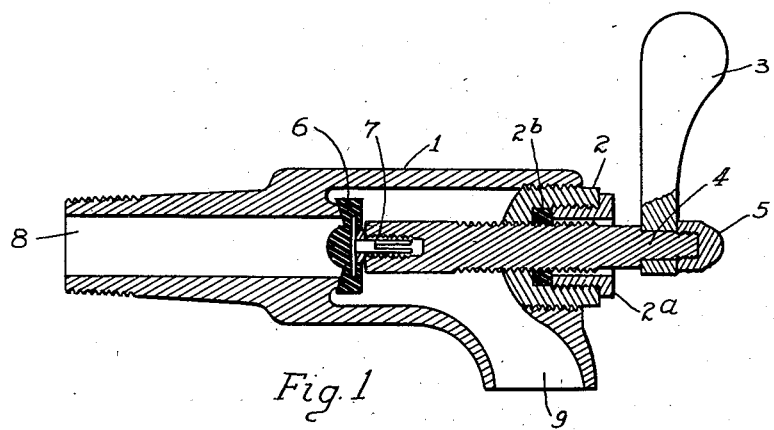

June 25, 1940.  J. D. LANGDON  2,205,533

VALVE AND VALVE MEMBER

Filed May 3, 1938

INVENTOR.

J. D. Langdon

Patented June 25, 1940

2,205,533

UNITED STATES PATENT OFFICE 2,205,533

VALVE AND VALVE MEMBER

Jesse D. Langdon, Los Angeles, Calif.

Application May 3, 1938, Serial No. 205,695

4 Claims. (Cl. 251—159)

My invention relates to valves, more particularly to stop cocks, faucets and shut-off valves for liquids; and the objects and purposes of my invention are:

First. To provide a quiet valve seating mechanism which will divert the directional flow of liquid to serve the purpose of holding the valve member against a valve stem.

Second. To reduce the velocity of liquid passing through the body of the valve by providing an enlarged passage beyond the inlet, and at the outlet of the valve to diminish noise and splashing where the valve is used to throw a stream into a receptacle.

Third. The provision of a valve member for use with a valve which will perform as a check valve and be proof against chattering or pounding of the valve member against the outlet seat.

Other and further objects and purposes will appear in the body of the specification, as illustrated by the drawing which is for the purpose of illustration only; and it is understood that the structure depicted is for the purpose of illustration only and may be changed for reduction to practice within the scope of the claims.

Briefly describing the drawing:

Fig. 1 shows a faucet type valve in longitudinal section comprising a body 1, packing plug 2, packing sleeve nut 2a, packing 2b, handle 3, handle stem 4, lock nut 5, valve member 6, shank 7, inlet port 8 and outlet port 9.

Figure 2:
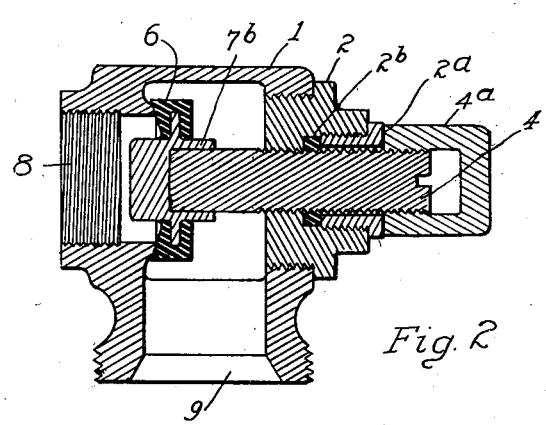

Fig. 2 is a shut-off connecting valve type including identical parts as Fig. 1 in longitudinal section, showing modified lock nut 4a and hollow shank 7b.

Figure 3:
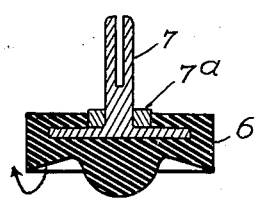

Fig. 3 is an enlarged sectional detail of valve member 6 showing split shank 7, bearing shoulder 7a, arrow indicating direction of fluid diversion.

Figure 4:
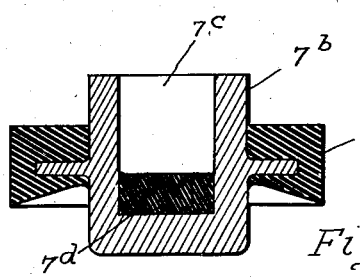

Fig. 4 shows a modified form of member 6 with a hollow shank 7b, guide 7c and pad 7d.

The faucet type valve body of Fig. 1 is formed with a restricted inlet 8 leading into a greatly enlarged outlet passage which slows the flow of any fluid passing to outlet 9 which is flared to slow up the flow of any fluid stream passing out of the valve by reducing the outlet velocity. Thus it will be seen that a mimimum of friction and splashing will occur where liquid is being drawn into a receptacle through the valve. The enlarged outlet passage and flared outlet 9 is also of advantage in preventing ignition of fluids in the shape of combustible gases by friction due to high velocity when passing the edge of an outlet in the presence of oxygen or air. The valve member 6 is shown with a split metal shank 7 projecting into a threaded hole to provide frictional contact so that a screw may be substituted for shank 7.

When the construction of the valve is modified to conform with Fig. 2 it has the advantage of forming a silent check valve for use as an intermediary or auxiliary shut-off to some other type of faucet or a flush valve for toilets or even in a pipe line for any fluid. The lock nut or cap 4a serves a dual purpose as a set nut to hold the stem 4 in various positions of adjustment and to act as a protective and ornamental cap. The shank 7b has a guide recess 7c with a pad 7d, as of Fig. 4, of relatively soft material disposed to act as a cushion to prevent a metallic knock when the valve member 6 is forced against the stem 4 by pressure. The valve member 8 is shown molded of rubber with an integral metal insert. Figure 3 is a male insert with the end of the shank 7 split for frictional insertion into a hole, while valve member 6 Fig. 4 has a female insert 7b molded integral therewith, a rubber pad 7d being disposed in the bottom of the hole 7c to prevent a metallic pounding noise and cushion the valve member 6 when forced suddenly against the stem 7b by fluid pressure when the valve is opened.

The valve member 6 is provided with a convex protuberance in the center having a concavity formed in its outer seating face adapted to seat against an inlet port, preferably provided with a sharp projecting seat to impinge said outer seating face. The shank 7 is provided to be slidably assembled with stem 4 to hold the valve member 6 concentric with the valve seat. The member 6 as of Fig. 3 is provided with a split shank 7 which may be spread to provide a slight frictional contact sufficient to retain the shank 7 in a hole in the stem 4 but still allow the stem 4 to rotate in relation to the shank 7 when the stem 4 is being rotated to open or close the valve. Thus the material of the valve 6 is prevented from being cut by rotation against a sharp seat provided around the inner end of inlet port 8. The modification of the valve member 6 as of Fig. 4 is provided to fit over the outside of the stem 4 and slide upon the stem to serve the same purpose as that of Fig. 3.

It will be noted that the valve member 6 of Fig. 3 is molded of rubber over the enlarged lower end of shank 7 and an eyelet forming a shoulder 7a to permit easy rotation and a minimum of friction between the stem 4 and valve member 6. The shank 7 or modification 7b are both molded integral with the valve member 6.

It will be noted that a recess is provided in the end of the chamber surrounding the valve seat to clear the projecting edge of member 6.

The concavity in the active face of valve member 6 serves to deflect the movement of fluid passing through the valve in the direction indicated by the arrow of Fig. 3. This form prevents the usual regurgitation which takes place behind the ordinary or conventional valve member, causing pounding and chattering of the member, particularly where the face of the member is convex and the velocity of fluid passing behind the member is great due to a more or less restricted passage. The convex face also serves to hold the valve member tightly impinged against the stem at all times during the passage of fluid through the valve.

Having described my invention and the operation thereof, I claim:

1. A valve casing comprising an inlet at one end and an outlet at one side, a valve seat projecting into said chamber at the inlet end to define a recess between said seat and the wall of said chamber, a stem extending through the other end of said chamber, a valve rotatably mounted on said stem and comprising a core carried thereon and a seating portion of flexible rubber-like material, said core comprising a radially extending flange, said rubber-like material encompassing said flange and having a concave seating face, the peripheral edge of said seating face extending radially outward of said seat and terminating short of the bottom of said recess to prevent chattering.

2. A valve device as defined in claim 1, including a shank carried by said core and a bearing around said shank for engagement with said valve stem.

3. A valve device as defined in claim 1, including a bearing cup on said core to receive the end of said stem.

4. A valve device as defined in claim 1, including a bearing cup on said core to receive said stem, and a cushion in the bottom of said cup.

JESSE D. LANGDON.